United States Patent
Schmidt et al.

(10) Patent No.: US 8,475,945 B2
(45) Date of Patent: Jul. 2, 2013

(54) COMPOSITE ARTICLE INCLUDING SILICON OXYCARBIDE LAYER

(75) Inventors: Wayde R. Schmidt, Pomfret Center, CT (US); Paul Sheedy, Vernon, CT (US); William Werkheiser, East Hartford, CT (US); Tania Bhatia Kashyap, Middletown, CT (US); Daniel G. Goberman, East Granby, CT (US)

(73) Assignee: United Technologies Corporation, Hartford, CT (US)

( * ) Notice: Subject to any disclaimer, the term of this patent is extended or adjusted under 35 U.S.C. 154(b) by 1 day.

(21) Appl. No.: 13/167,425

(22) Filed: Jun. 23, 2011

(65) Prior Publication Data
US 2012/0328886 A1    Dec. 27, 2012

(51) Int. Cl.
*B32B 9/00*    (2006.01)

(52) U.S. Cl.
USPC ............ 428/698; 428/446; 428/697; 428/699

(58) Field of Classification Search
USPC .................. 428/446, 697, 698, 701
See application file for complete search history.

(56) References Cited

U.S. PATENT DOCUMENTS

| | | | |
|---|---|---|---|
| 6,254,975 B1 | 7/2001 | Kayser et al. | |
| 6,261,643 B1 | 7/2001 | Hasz et al. | |
| 6,475,254 B1 * | 11/2002 | Saak et al. | 51/307 |
| 7,374,818 B2 * | 5/2008 | Bhatia et al. | 428/702 |
| 8,252,131 B2 * | 8/2012 | Heng et al. | 156/89.11 |
| 2009/0324930 A1 | 12/2009 | Tulyani et al. | |
| 2011/0003077 A1 | 1/2011 | Heng et al. | |

* cited by examiner

*Primary Examiner* — Archene Turner
(74) *Attorney, Agent, or Firm* — Carlson, Gaskey & Olds, P.C.

(57) ABSTRACT

A composite article includes a substrate, at least one protective layer on the substrate and an intermediate layer between the at least one protective layer and the substrate. The intermediate layer includes dense silicon oxycarbide.

27 Claims, 1 Drawing Sheet

COMPOSITE ARTICLE INCLUDING SILICON OXYCARBIDE LAYER

STATEMENT REGARDING FEDERALLY SPONSORED RESEARCH OR DEVELOPMENT

This invention was made with Government support under N00014-09-C-0201 awarded by The United States Navy. The Government has certain rights in this invention.

BACKGROUND

This disclosure relates to composite articles such as those used in gas turbine engines.

Components, such as gas turbine engine components, may be subjected to high temperatures, corrosive and oxidative conditions, and elevated stress levels. In order to improve the thermal and oxidative stability of these components, the component may include a protective layer such as an environmental barrier, a thermal barrier or a velocity barrier coating or a coating that is selectively abradable or resistant to erosion. The barrier coating may be a multi-layer coating that includes a top coat and a bond coat beneath the top coat to adhere the top coat to the underlying substrate.

SUMMARY

Disclosed is a composite article that includes a substrate, at least one protective layer on the substrate and an intermediate layer between the at least one protective layer and the substrate. The intermediate layer includes dense silicon oxycarbide.

In another aspect, a composite article includes a substrate having a silicon-containing material and at least one protective layer on the substrate. The protective layer is free of metallic silicon or a metallic alloy. An intermediate layer is located between the protective layer and substrate and includes silicon oxycarbide.

Also disclosed is a method of processing a composite article that includes forming an intermediate layer on a substrate, where the intermediate layer includes silicon oxycarbide. At least one protective layer is formed on the intermediate layer.

The various features and advantages of the disclosed examples will become apparent to those skilled in the art from the following detailed description. The drawings that accompany the detailed description can be briefly described as follows.

DETAILED DESCRIPTION

Figure 1:
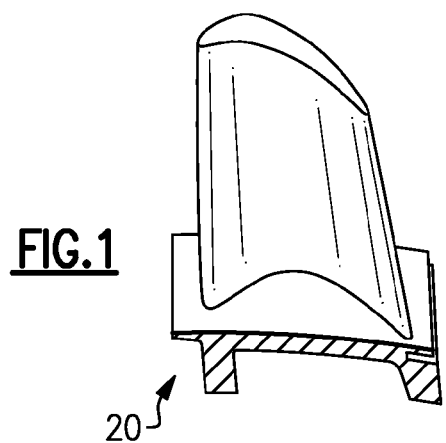
FIG. 1 schematically illustrates an example composite article that is a turbine blade.

FIG. 1 shows a composite article 20. In this example, the composite article 20 is a turbine blade for a gas turbine engine, although this disclosure is not limited to such components. The composite article 20 may alternatively be a combustor liner, a turbine vane, compressor blade or vane, blade outer air seal or other component that would benefit from this disclosure. It is also to be understood that the composite article 20 is not limited to components that are used for gas turbine engines and that components in other fields that are subjected to harsh thermal and environmental conditions will also benefit from this disclosure.

Figure 2:
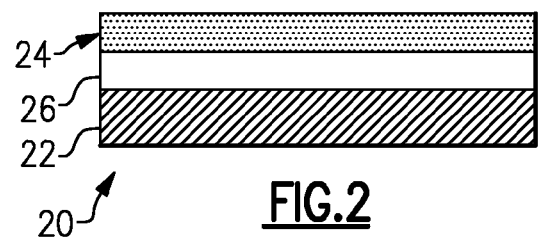
FIG. 2 schematically illustrates a cross-section of a portion of a composite article having an intermediate layer that includes silicon oxycarbide.

FIG. 2 shows a cross-section of a portion of the composite article 20. As an example, the portion may be from the airfoil-shaped blade section of the turbine blade. The composite article 20 includes a substrate 22, at least one protective layer 24 on the substrate, and an intermediate layer 26 between the protective layer 24 and the substrate 22. The protective layer 24, or layers, and the intermediate layer 26 may together be considered to be an environmental barrier coating, thermal barrier coating, velocity barrier, abradable coating, or erosion resistant coating, depending upon the materials selected for the respective layers 24 and 26.

The substrate 22 in the illustrated example comprises a superalloy material, a ceramic material, a glass or glass/ceramic, carbon or combinations thereof. The superalloy material may be nickel-based, cobalt-based or nickel-iron-based. The ceramic material may include carbides, oxides, nitrides, borides, silicides, oxycarbides, oxynitrides, carbonitrides, aluminides, silicates, titanates, phosphates, phosphides, or combinations thereof. The glass and glass/ceramic materials may include silica, borosilicates, barium aluminosilicates, lanthanum aluminosilicates, strontium magnesium silicates, barium magnesium aluminosilicates and lithium-containing glasses.

The substrate 22 in the illustrated example may be monolithic (i.e., formed of a single, continuous mass of material) or a composite of several different ceramic materials or ceramic and metallic materials. In one example, the substrate 22 is a ceramic matrix composite, where the ceramic matrix material forms a continuous phase in which at least one reinforcement phase of another material is distributed. The reinforcement phase can be a discontinuous phase of another material, such as a filler, or the reinforcement phase can be a continuous phase, such as fibers. The reinforcing phase may also consist of chopped fibers. The ceramic matrix may be selected from carbides, oxides, nitrides, borides, silicides, oxycarbides, oxynitrides, carbonitrides, aluminides, silicates, titanates, phosphates, phosphides or combinations thereof.

In a further example, the ceramic material includes a silicon-containing ceramic material, such as silicon carbide, silicon oxycarbide, silicon oxynitride, or a glass, glass/ceramic material, or other oxide, carbide, nitride, boride, or combination thereof that includes silicon.

The protective layer 24 of the illustrated example includes, or alternatively is substantially entirely composed of a ceramic material, such as an oxide ceramic. The oxide ceramic may contain zirconia, hafnia, gadolinia, silica, silicates, or combinations thereof. The silicate may include a rare earth element silicate material that includes a rare earth element selected from the 15 lanthanide series elements, yttrium and scandium. In one example, the protective layer 24 contains yttrium silicate. The ratio of the rare earth element to silica may vary between 1:0.8 and 1:4 by mole content.

In a further example, the protective layer 24, or at least the one layer of the protective layer 24 that is in contact with the intermediate layer 26, includes hafnia if the intermediate layer 26 includes hafnia or a hafnium-containing material. Similarly, if the intermediate layer 26 includes other materials in addition to the silicon oxycarbide, the protective layer 24 that is in contact with the intermediate layer 26 may also include at least one of those other materials such that the protective layer 24 and the intermediate layer 26 include at least one common material with regard to composition.

In the illustrated example, the protective layer 24 or layers are free of any layers that include metallic silicon or a metallic alloy. Layers of metallic silicon or a metallic alloy are generally used as oxygen gettering layers in thermal or environmental barrier systems. However, the intermediate layer 26 of the disclosed arrangement provides the function of such oxygen gettering layers.

The intermediate layer 26 includes silicon oxycarbide. In one example, the silicon oxycarbide is an amorphous compound that includes covalently bonded silicon, oxygen and carbon. Depending upon the particular selection of starting materials and processing technique(s) used to form the intermediate layer 26, the average composition of the silicon oxycarbide may vary. In one example, the average composition of the silicon oxycarbide is $SiO_xC_y$, where x<2 and y>0. In a further example, the average composition of the silicon oxycarbide is $SiO_{1.3}C$.

In the illustrated example, and in particular in combination with the feature that the protective layer 24 is free of metallic silicon or a metallic alloy, the intermediate layer 26 includes dense silicon oxycarbide. For example, dense silicon oxycarbide refers to nominally dense, substantially dense or fully dense silicon oxycarbide. For example, the silicon oxycarbide is nominally dense and contains up to a maximum of 10% porosity. In a further example, the silicon oxycarbide is substantially dense and contains a maximum of 5% porosity. In yet a further example, the silicon oxycarbide is fully dense and contains a maximum of 2% or less porosity. As a whole, the intermediate layer 26 may have a higher porosity if other materials are used in combination with the nominally dense silicon oxycarbide. In that regard, the silicon oxycarbide may be a constituent in the intermediate layer 26 that is confined to discrete regions within the intermediate layer 26 or the silicon oxycarbide may compose the intermediate layer 26 to the exclusion of other materials, with the exception of trace impurities.

Figure 3:
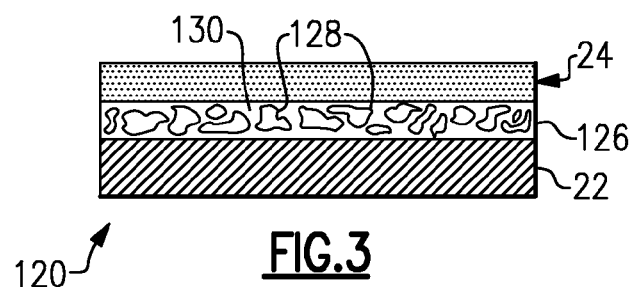
FIG. 3 schematically illustrates a cross-section of a portion of a composite article having an intermediate layer with discrete regions of silicon oxycarbide.

FIG. 3 shows a cross-section of a portion of a composite article 120 that is similar to the composite article 20 shown in FIG. 2 with regard to the substrate 22 and protective layer 24. An intermediate layer 126, between the substrate 22 and protective layer 24, includes silicon oxycarbide, as described above. In this example, the silicon oxycarbide occupies a plurality of discrete regions 128 within the intermediate layer 126. The regions 128 are perceptibly distinct (e.g., by metallographic techniques) and may be approximately 1-100 micrometers in average diameter. In one example, the silicon oxycarbide of the regions 128 is nominally, substantially or fully dense silicon oxycarbide, as described above. The regions 128 of silicon oxycarbide are dispersed within a matrix region 130. In the illustrated example, the matrix region 130 is continuous and generally surrounds the regions 128, although in other examples the silicon oxycarbide is the continuous matrix in which another material is dispersed. The intermediate layer 126 may be of a desired thickness for protecting the underlying substrate 22. For example, the intermediate layer 26 may be 10-1000 micrometers thick and in some examples is 25-500 micrometers thick.

The material of the matrix region 130 is or includes carbides, oxides, nitrides, borides, silicides, oxycarbides, oxynitrides, carbonitrides, aluminides, silicates, titanates, phosphates, phosphides, or combinations thereof. In further examples, the matrix region 130 includes hafnium, yttrium, molybdenum, silicon dioxide, silicon carbide or combinations thereof. In one example, the material of the matrix region 130 includes hafnia ($HfO_2$). In other examples, the silicate material of the matrix region 130 may include a rare earth element silicate material that includes a rare earth element selected from the 15 lanthanide series elements, yttrium and scandium. In one example, the material of the matrix region 130 contains yttrium silicate. The ratio of the rare earth element to silica may vary between 1:0.8 and 1:4 by mole content. In another example, the material of the matrix region 130 includes molybdenum disilicide ($MoSi_2$). Alternatively, or in combination with the above example materials, the material of the matrix region 130 includes at least one of silicon dioxide ($SiO_2$) or silicon carbide (SiC).

In a further example, the material of the matrix region 130 is a silicate material. For instance, the silicate material is a refractory metal silicate, a rare earth metal silicate or combination thereof. In one example, the silicate is a silicate of a rare earth metal, hafnium and zirconium. Refractory metals include niobium, molybdenum, tantalum, tungsten, rhenium, titanium, vanadium, chromium, zirconium, hafnium, ruthenium, osmium, iridium and combinations thereof. Rare earth metals include the fifteen lanthanide elements, scandium, yttrium and combinations thereof.

In a further example, the material of the matrix region 130 is an oxide material. For instance, the oxide material is a refractory metal oxide, such as hafnia, yttria, rare earth oxide, or combination thereof.

The amount of silicon oxycarbide in the intermediate layer 126 may be varied depending upon the properties desired for the end use application. The silicon oxycarbide provides the composite article 120 with thermal/oxidative stability and thermal expansion matching between the substrate and the protective layer 24, and acts as a bond coat between the substrate 22 and the protective layer 24. The thermal and oxidative stability of the silicon oxycarbide may be enhanced through the addition of the materials of the matrix region 130. In that regard, the amount of silicon oxycarbide may be varied relative to the amount of material in the matrix region 130 and the total amount of material in the intermediate layer 126. In one example, the amount of silicon oxycarbide in the intermediate layer 126 is greater than 10 vol. % with regard to all other phases and regions within the intermediate layer 126. In a further example, the amount of silicon oxycarbide is at least 50 vol. % and nominally may be 70-100 vol. %.

Figure 4:
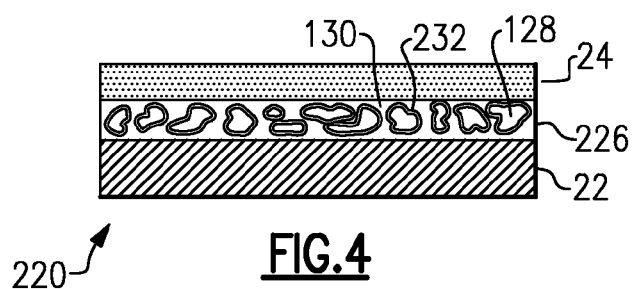
FIG. 4 schematically illustrates a cross-section of a portion of a composite article having discrete regions of silicon oxycarbide within a matrix region and an intermediate region between the silicon oxycarbide and the matrix region.

FIG. 4 shows a cross-section of a portion of a composite article 220 that is similar to the composite article 20 shown in FIG. 1 with regard to the substrate 22 and the protective layer 24. In this example, the composite article 220 includes an intermediate layer 226 between the protective layer 24 and the substrate 22. The intermediate layer 226 is somewhat similar to the intermediate layer 126 in FIG. 3 with the exception that there is an intermediate region 232 between the regions 128 of silicon oxycarbide and the matrix region 130. As an example, the intermediate region 232 generally surrounds each of the regions 128. In the alternative where the silicon oxycarbide is the matrix region 130, the intermediate region 232 would surround or at least partially surround the regions 128 of other material. In other examples, the intermediate region 232 surrounds a portion of each region 128 or completely surrounds some regions 128 and partially surrounds other regions 128.

The intermediate regions 232 in the illustrated example include at least one material that is not found in either of the matrix region 130 or the region 128 of silicon oxycarbide. In one example, the material of the intermediate region 232 is a derivative material from the silicon oxycarbide, the material of the matrix region 130 or both. As an example, the material of the intermediate region 232 may include silicon dioxide, silicon carbide or both, which are formed from the silicon oxycarbide within the regions 128. That is, with heat treatment at temperatures of approximately 1000° C./1832° F. or greater in an oxygen-containing environment, the silicon oxycarbide near the perimeter of the regions 128 transforms or reacts with the surrounding material and/or oxygen from the surrounding environment to form a new compositional layer around the core of the region 128. In the case of silicon dioxide, or possibly other reaction products of the silicon oxycarbide, the material of the intermediate region 232 acts as a passivating layer that insulates the silicon oxycarbide material within the regions 128 from exposure to oxygen from the surrounding environment. Thus, the intermediate region 232 stabilizes the silicon oxycarbide to render the intermediate layer 226 more durable with regard to exposure to elevated temperature and severe environmental conditions. For intermediate layers that are composed substantially of silicon oxycarbide, the same phenomena would be expected at the interface of the intermediate layer and protective layer 24, to stabilize the silicon oxycarbide intermediate layer 26, 126, or 226 and substrate 22 against substantially further degradation.

In the example where the matrix region 130 is the silicon oxycarbide, the regions 128 are comprised of a material as described above with regard to the matrix region 130. In one example, the regions 128 are or include hafnia and the intermediate region 232 is or includes hafnium silicate. The hafnium silicate of the intermediate region 232 limits or prevents the hafnia from reacting with the surrounding silicon oxycarbide.

The intermediate layer 26, 126, 226 of the illustrated examples may be formed in a deposition process, such as plasma spraying of powder starting materials, slurry coating, dipping, painting, electrophoretic deposition, spraying or other suitable ceramic processing technique. In that regard, the method of processing the composite article 20, 120, 220 includes forming the intermediate layer 26, 126, 226 on the substrate 22 and then forming the protective layer 24 or layers on the intermediate layer 26, 126, 226. The protective layer 24 may be formed by using the same technique as the intermediate layer 26, 126, 226, or by using a different technique.

The starting materials used in the coating method have an approximately equivalent composition, as a whole, to the desired composition of the intermediate layer 26, 126, 226, as a whole. In one example, the starting material includes a powder having the desired composition of the intermediate layer 26, 126, 226. Alternatively, the starting material includes a plurality of different powders having, as a whole, the desired composition of the intermediate layer 26, 126, 226. The powder starting material may be a composite powder where individual powder particles contain one or more of the example materials disclosed herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is offered as an example and not intended to be limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
   a substrate;
   at least one protective layer on the substrate; and
   an intermediate layer between the at least one protective layer and the substrate, the intermediate layer including dense silicon oxycarbide, the dense silicon oxycarbide being an amorphous compound and having an average composition of $SiO_xC_y$, where x<2 and y>0.

2. The composite article as recited in claim 1, wherein the at least one protective layer is free of metallic silicon or a metallic alloy.

3. The composite article as recited in claim 1, wherein the intermediate layer includes hafnium.

4. The composite article as recited in claim 1, wherein the intermediate layer includes yttrium.

5. The composite article as recited in claim 1, wherein the intermediate layer includes molybdenum.

6. The composite article as recited in claim 1, wherein the intermediate layer includes at least one of silicon dioxide or silicon carbide.

7. The composite article as recited in claim 1, wherein the intermediate layer includes greater than 50 vol. % of the dense silicon oxycarbide.

8. The composite article as recited in claim 1, wherein the intermediate layer includes 70-100 vol. % of the dense silicon oxycarbide.

9. The composite article as recited in claim 1, wherein the at least one protective layer includes an oxide ceramic.

10. The composite article as recited in claim 1, wherein the substrate includes a silicon-containing material.

11. A composite article comprising:
    a substrate including a silicon-containing material;
    at least one protective layer on the substrate, the at least one protective layer being free of any layers that contain at least one of metallic silicon or a metallic alloy; and
    an intermediate layer between the at least one protective layer and the substrate, the intermediate layer including regions of silicon oxycarbide that are dispersed within a matrix, and the regions of silicon oxycarbide are in direct contact with intermediate regions interposed between the regions of silicon oxycarbide and the matrix.

12. The composite article as recited in claim 11, wherein the silicon oxycarbide is dense silicon oxycarbide.

13. The composite article as recited in claim 11, wherein the intermediate layer includes a material selected from a group consisting of hafnium, yttrium, silicon dioxide, molybdenum, silicon carbide and combinations thereof.

14. The composite article as recited in claim 11, wherein the intermediate layer includes a material selected from a group consisting of a refractory metal silicate, a rare earth metal silicate and combinations thereof.

15. The composite article as recited in claim 11, wherein the at least one protective layer includes an oxide ceramic.

16. The composite article as recited in claim 11, wherein the intermediate layer includes a plurality of regions of silicon oxycarbide that are distributed within a matrix region that includes at least one of hafnium, yttrium or molybdenum, and an intermediate region between the plurality of regions of silicon oxycarbide and the matrix region, the intermediate region including at least one of silicon dioxide or silicon carbide.

17. The composite article as recited in claim 1, wherein the average composition of the silicon oxycarbide is $SiO_{1.3}C$.

18. The composite article as recited in claim 11, wherein the intermediate regions respectively surround the regions of the silicon oxycarbide.

19. The composite article as recited in claim 11, wherein the matrix is a rare earth oxide.

20. The composite article as recited in claim 11, wherein the matrix includes yttria.

21. The composite article as recited in claim 11, wherein the matrix includes hafnia.

22. The composite article as recited in claim 11, wherein the matrix is a rare earth silicate.

23. The composite article as recited in claim 22, wherein the rare earth silicate has a ratio, by mole content, of rare earth element to silica between 1:0.8 and 1:4.

24. The composite article as recited in claim 22, wherein the rare earth silicate includes hafnium silicate.

25. The composite article as recited in claim 22, wherein the rare earth silicate includes zirconium silicate.

26. The composite article as recited in claim 11, wherein the matrix is a refractory metal silicate, wherein the refractory metal is selected from the group consisting of niobium, tantalum, tungsten, rhenium, titanium, vanadium, chromium, zirconium, hafnium, ruthenium, osmium, iridium and combinations thereof.

27. The composite article as recited in claim 11, wherein the intermediate regions include a material that is not found in the matrix and the regions of silicon oxycarbide.

\* \* \* \* \*